United States Patent
Srinivasan et al.

(10) Patent No.: US 7,970,482 B2
(45) Date of Patent: Jun. 28, 2011

(54) METHOD AND SYSTEM FOR PROCESS CONTROL

(75) Inventors: Ranganathan Srinivasan, Bangalore (IN); J. Ward MacArthur, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 853 days.

(21) Appl. No.: 11/836,289

(22) Filed: Aug. 9, 2007

(65) Prior Publication Data

US 2009/0043546 A1 Feb. 12, 2009

(51) Int. Cl.
G05B 13/02 (2006.01)
G06G 7/48 (2006.01)
G06F 17/10 (2006.01)

(52) U.S. Cl. ........... 700/31; 700/21; 700/28; 700/29; 700/30; 703/2; 703/4; 703/6

(58) Field of Classification Search ........... 700/28–31, 700/21; 703/2, 4, 6
See application file for complete search history.

(56) References Cited

U.S. PATENT DOCUMENTS

| | | | | |
|---|---|---|---|---|
| 5,949,678 | A * | 9/1999 | Wold et al. | 700/83 |
| 5,999,718 | A * | 12/1999 | Wang et al. | 703/2 |
| 6,560,569 | B1 * | 5/2003 | Abu El Ata | 703/2 |
| 6,980,938 | B2 * | 12/2005 | Cutler | 703/2 |
| 7,139,623 | B2 | 11/2006 | Adams et al. | |
| 7,359,830 | B2 * | 4/2008 | Hupkes et al. | 702/182 |
| 7,672,820 | B2 * | 3/2010 | Glass | 703/6 |
| 7,680,637 | B1 * | 3/2010 | Wolodkin | 703/6 |
| 7,881,815 | B2 * | 2/2011 | Srinivasan et al. | 700/31 |
| 2007/0021852 | A1 | 1/2007 | Kishore et al. | |
| 2007/0088446 | A1 | 4/2007 | Srinivasan et al. | |
| 2007/0100471 | A1 | 5/2007 | Kumar et al. | |
| 2008/0183311 | A1 * | 7/2008 | MacArthur et al. | 700/29 |
| 2009/0012773 | A1 * | 1/2009 | Glass et al. | 703/21 |
| 2009/0143872 | A1 * | 6/2009 | Thiele et al. | 700/30 |

OTHER PUBLICATIONS

Jadbabaie et al. "A Globally Stabilizing Receding Horizon Controller for Neutrally Stable Linear Systems with Input Constraints", Proceedings of the 41st IEEE Conference on Decision and Control 2002, Dec. 2002, Las Vegas, Nevada, vol. 1, pp. 1096-1100.

Bemporad et al. "Performance Analysis of Piecewise Linear Systems and Model Predictive Control Systems", Proceedings of the 39th IEEE Conference on Decsion adn Control 2000, Mar. 2000, Sydney, Australia, vol. 5, pp. 4957-4962.

* cited by examiner

Primary Examiner — Albert DeCady
Assistant Examiner — Jennifer L Norton
(74) Attorney, Agent, or Firm — Jetter & Associates, P.A.

(57) ABSTRACT

A method and system for process control using a model predictive controller. The control system can have one or more control devices operably coupled to a processing system for controlling a process of the processing system; a modeling tool to provide a non-linear model based at least in part on the process and to provide a plurality of linearized models based at least in part on the non-linear model, where the plurality of linearized models are linearized at different linearization rates; and a controller operably coupled to the modeling tool. The controller can select one of the plurality of linearized models based on a comparison of the plurality of linearized models with a reference model. The controller can send one or more control signals to at least one of the one or more control devices. The one or more control signals can be determined using the selected one of the plurality of linearized models.

20 Claims, 5 Drawing Sheets

METHOD AND SYSTEM FOR PROCESS CONTROL

FIELD OF THE INVENTION

This disclosure relates generally to process control systems and more specifically to a method and system for process control using model predictive controllers (MPC).

BACKGROUND

Processing facilities, such as manufacturing plants, chemical plants and oil refineries, are typically managed using process control systems. Valves, pumps, motors, heating/cooling devices, and other industrial equipment typically perform actions needed to process materials in the processing facilities. Among other functions, the process control systems often manage the use of the industrial equipment in the processing facilities.

In conventional process control systems, controllers are often used to control the operation of the industrial equipment in the processing facilities. The controllers can typically monitor the operation of the industrial equipment, provide control signals to the industrial equipment, and/or generate alarms when malfunctions are detected. Process control systems typically include one or more process controllers and input/output (I/O) devices communicatively coupled to at least one workstation and to one or more field devices, such as through analog and/or digital buses. The field devices can include sensors (e.g., temperature, pressure and flow rate sensors), as well as other passive and/or active devices. The process controllers can receive process information, such as field measurements made by the field devices, in order to implement a control routine. Control signals can then be generated and sent to the industrial equipment to control the operation of the process.

Advanced controllers often use model-based control techniques to control the operation of the industrial equipment. Model-based control techniques typically involve using an empirical model to analyze input data, where the model identifies how the industrial equipment should be controlled based on the input data being received.

Model predictive controllers (MPCs) rely on dynamic models of the process, most often linear empirical models obtained by system identification. The models are used to predict the behavior of dependent variables (e.g. outputs) of a dynamic system with respect to changes in the process independent variables (e.g. inputs). In chemical processes, independent variables are most often setpoints of regulatory controllers that govern valve movement (e.g., valve positioners with or without flow, temperature or pressure controller cascades), while dependent variables are most often constraints in the process (e.g., product purity, equipment safe operating limits). The model predictive controller uses the models and current plant measurements to calculate future moves in the independent variables that will result in operation that attempts to satisfy all independent and dependent variable constraints. The MPC then sends this set of independent variable moves to the corresponding regulatory controller setpoints to be implemented in the process.

One such model-based control technique utilizes a linear MPC for control of a non-linear process with complex constrained multivariable control issues. At each sampling time (starting at the current state), an open-loop optimal control problem is solved over a finite horizon. At the next time step, the computation is repeated starting from the new state and over a shifted horizon, leading to a moving horizon policy. Thus, the control process linearizes around each operating point, by recalculating the model corresponding to current operating regions. However, linearizing at all steps of the process to be controlled to obtain a conventional MPC solution, greatly increases the computational load for the control system. This can be especially significant for more complex processes with large numbers of operational parameters and variables.

Accordingly, there is a need for a method and system for process control that can provide an operator with an understanding of the extent of non-linearity of the process to be controlled. There is a further need for such a method and system that allows for obtaining acceptable control performance while minimizing computational time or load.

SUMMARY

The Summary is provided to comply with 37 C.F.R. §1.73, requiring a summary of the invention briefly indicating the nature and substance of the invention. It is submitted with the understanding that it will not be used to interpret or limit the scope or meaning of the claims.

A method and system for process control is provided. The method and system can include providing an operator with an understanding of the extent of non-linearity of the process to be controlled and/or provides an acceptable control performance while minimizing computational time or load.

In one exemplary embodiment of the present disclosure, a method of controlling a non-linear process is provided. The method can include providing a non-linear model based at least in part on the non-linear process; providing a plurality of linearized models based at least in part on the non-linear model, where the plurality of linearized models are linearized at different linearization rates; selecting one of the plurality of linearized models based at least in part on a comparison of the plurality of linearized models with a reference model; and controlling the non-linear process by sending one or more control signals from a controller to at least one control device. The one or more control signals can be determined using the selected one of the plurality of linearized models.

In another exemplary embodiment, a control system operably coupled to a processing system is provided. The control system can include one or more control devices operably coupled to a processing system for controlling a process of the processing system; a modeling tool to provide a non-linear model based at least in part on the process and to provide a plurality of linearized models based at least in part on the non-linear model, where the plurality of linearized models are linearized at different linearization rates; and a controller operably coupled to the modeling tool. The controller can select one of the plurality of linearized models based on a comparison of the plurality of linearized models with a reference model. The controller can send one or more control signals to at least one of the one or more control devices, and the one or more control signals can be determined using the selected one of the plurality of linearized models.

In a further exemplary embodiment, a computer-readable storage medium comprising computer-readable program instructions for controlling a non-linear process, is provided. The program can have program instructions for causing a computer to receive a non-linear model of the non-linear process from a modeling tool; program instructions for causing said computer to receive a plurality of linearized models based at least in part on the non-linear model from the modeling tool, where the plurality of linearized models are linearized at different linearization rates; program instructions for providing a comparison of the plurality of linearized models with a reference model; and program instructions for causing said computer to send one or more control signals to at least one control device operably coupled with a processing system performing the non-linear process. The one or more control signals can be determined using a selected one of the plurality of linearized models. The selection can be based at least in part on the comparison of the plurality of linearized models with the reference model.

The technical effect can include, but is not limited to, providing an operator with a better understanding of the non-linearity of the process to be controlled, which can allow for improvements in balancing of control performance with computational load.

The above-described and other features and advantages of the present disclosure will be appreciated and understood by those skilled in the art from the following detailed description, drawings, and appended claims.

DETAILED DESCRIPTION OF THE INVENTION

Figure 1:
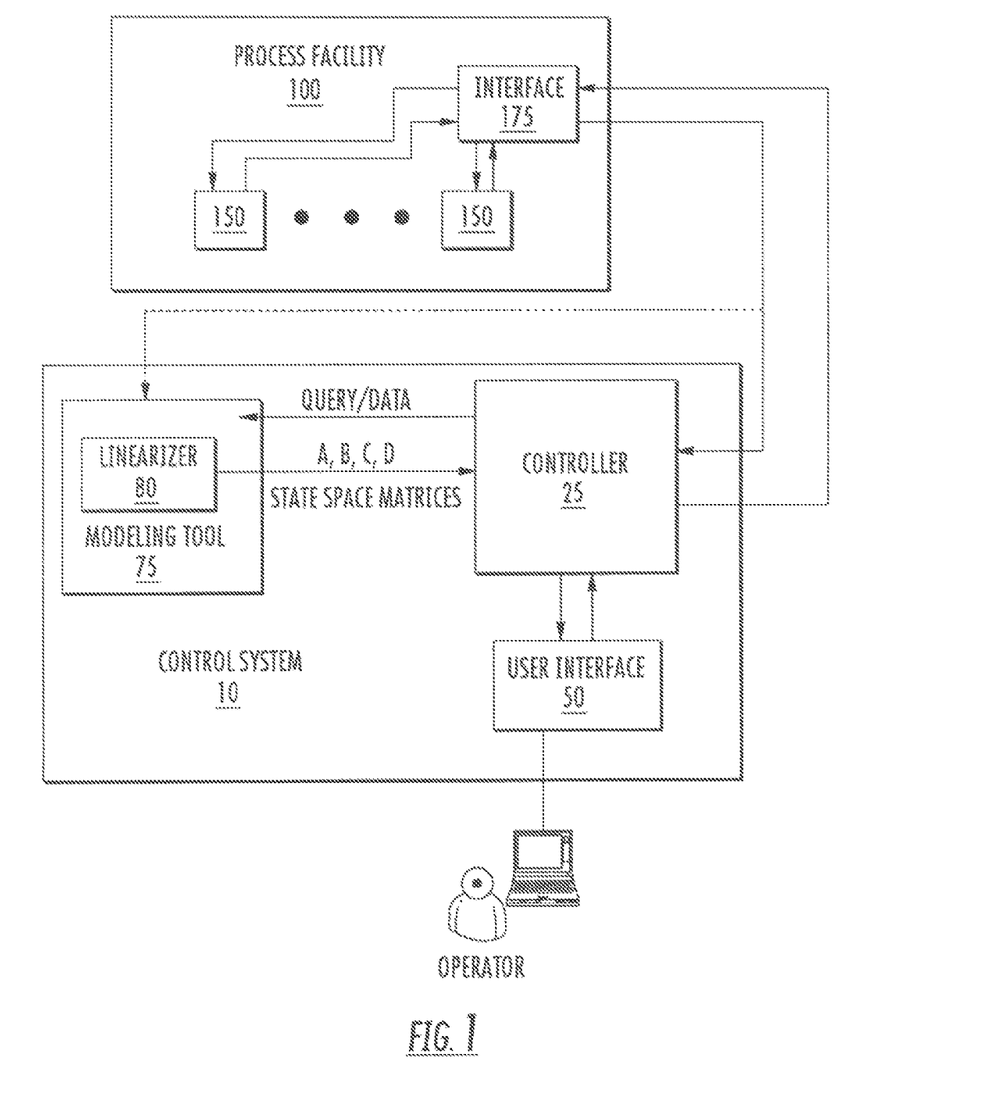
FIG. 1 is a schematic illustration of an exemplary system for process control according to an embodiment of the present invention coupled to a processing facility.

Referring to the drawings, and in particular to FIG. 1, a control system is shown and generally represented by reference numeral 10. Control system 10 can be used with various processing facilities and various processes, such as manufacturing processes, chemical plants and oil refineries, to name but a few. The present disclosure also contemplates the use of control system 10 with systems undergoing processes that may result in other types of end products, such as control of a gas turbine powering an aircraft. The particular type of system, facility and/or process that is to be controlled is not intended to be limited. Control system 10 can provide for control of a multi-variable process and can be applied to a non-linear process.

Control system 10 can include a controller 25, a user interface 50, and a modeling tool 75. The present disclosure also contemplates the use of other components, and combinations of components that can receive and/or retrieve operational parameters; retrieve, receive and/or generate non-linear models; retrieve, receive and/or generate linearized models from the non-linear models; and/or implement control with respect to one or more processes or systems. The present disclosure contemplates that the controller 25, the user interface 50, and the modeling tool 75 can be separate components or can be integrated with each other, such as in a single processor or computer.

The controller 25 can be coupled to, or in communication with, one or more control devices 150 of a process facility 100, such as through use of an interface 175. The coupling or communication can be through use of various components and techniques, including hardwire, optical and/or wireless couplings. The present disclosure also contemplates the control system 10 being in direct communication with one or more of the control devices 150, such as directly controlling each of the devices or in a master-slave configuration of devices. Although not shown, control system 10 can be coupled to the process facility 100 by way of an application server. The present disclosure also contemplates other components and techniques for coupling the control system 10 to the processing facility 100. The control devices 150 can be various devices integrated into the process of facility 100, including valves, pumps, motors, heating/cooling devices, and other industrial equipment, as well as sensors (e.g., temperature, pressure, and flow rate sensors), and other passive and/or active devices. The present disclosure is not intended to be limited by the type of control devices that are used to implement the control of the process, and can include a variety of devices and combinations of devices, such as a subsystem to adjust pressure and/or temperature in a portion of the process.

The control system 10 can include associated writeable memory, which is preferably non-volatile, to serve as a data repository for various variables, data or other information, such as storing operational variables that have been determined based upon operational parameters that were measured or otherwise sensed from the process being controlled. The memory can be part of the controller 25, modeling tool 75, and/or another component of the control system 10, such as for storing the models provided by the modeling tool. Process facility 100 can be associated with two types of variables which are the independent variables and the dependent variables. The independent variables can be inputs to the facility 100, including manipulated variables which can be changed by the operator (e.g., proportional-integral-derivative (PID) controller set points) and disturbance variables which may not be changeable by the operator but have an effect on the system (e.g., feed composition, feed temperature, and ambient temperature). The dependent variables can be outputs from the process facility system 100 which are effected by changes in the independent variables and which may not be directly changeable by the operator. The values of the various dependent variables can be controlled by changing the values of the one or more manipulated variables. Data or other signals can be communicated between the controller 25 and the interface 175 and/or can bypass the controller and go directly to another component of the control system, such as to the modeling tool 75 as represented by the broken line in FIG. 1.

The user interface 50 can present various control information, such as to an operator, including displays corresponding to process parameters, and trends for controller inputs and/or outputs. The particular type of controller information presented can vary based upon the type of processing facility and the type of process being controlled, such as feed rates and product average molecular weights in a polymerization process. The user interface 50 can also receive various commands or other inputs from the operator, such as a prediction request for proposed operating conditions or other proposed events. For example, the user interface 50 can provide for customization of the presentation and/or retrieval of information, inputs, outputs, and the like. The user interface 50 can utilize various platforms, such as a Honeywell Experion® Process Knowledge System (EPKS) station.

Modeling tool 75 can be used for retrieving, receiving, generating and/or otherwise providing one or more non-linear models representative of the process or a portion thereof of facility 100. In one embodiment, input files can be provided to the modeling tool 75, such as from an external source (e.g., compact disk) or communicated to the modeling tool from another component of the control system (e.g., the controller 25) or from an external source (e.g., a remote server). The input files can be of various formats depending on the programming platform or platforms being utilized for modeling, and can include various data, such as state variables, initial conditions, reference trajectory, system matrices, control matrices, output matrices, feed-forward matrices, and others. Output files can be provided by the modeling tool 75 to the controller 25. The output files can be of various formats, and can include various data, such as state space matrices, state variables, intermediate variable and others. The modeling tool can utilize carious types of models, such as the state space model, as well as various types of filtering, such as Kalman filtering.

The modeling tool 75 can have a linearizer 80 to provide or otherwise generate linearized models (e.g., a state space model), which can include piecewise linear models, based upon a generally non-linear model of the non-linear process, at the request or query from the controller 25. The linearizer can utilize known techniques for linearizing a model. The present disclosure also contemplates the modeling tool 75 using other resources for linearizing the non-linear model, such as another processor that communicates the linearization data (e.g., A, B, C, and D coefficient matrices of the state equations for a state space model) to the modeling tool 75 or the controller 25.

In another embodiment, the modeling tool 75 can have an optimizer (not shown) and/or predictor (not shown). The optimizer can optimize the control of the process, such as based at least in part on one or more operational variables that are generated from operational parameters, including measurements taken from control devices 150 (e.g., sensors), as well as based upon a model for the process. For example, an operator can request controller information related to a specific event, such as the changing of a product. The optimizer can determine the optimum control conditions (e.g., minimization of time or cost) for implementation of the specific event.

The predictor of the modeling tool 75 can predict a state of the process based at least in part on one or more system variables (e.g., proposed variables), the model and the controller algorithms. For example, an operator can request or query a prediction for the state of the process if run at a different flow rate, pressure and/or temperature. Through user interface 50, control information can be displayed associated with the predicted state, such as product specifications (e.g., average molecular weight in the case of a polymerization process).

The following derivation is indicative that time dependence of the control algorithms can be utilized in accurately modeling the behavior of the process of facility 100. A non-linear process to be controlled can in general be represented by equation one:

$$\dot{x} = f(x, u) \tag{1}$$

where x is the initial state and u is the control trajectory. Considering a small deviation ($\Delta x$) from an operating point of the process results in equation two:

$$x(t) = x_0 + {}^*\Delta(x)^- \tag{2}$$

A Taylor series expansion can be performed for equation two around the operating point ($x_0, u_0$) resulting in equation three, where higher order terms (second derivative and above) have been ignored:

$$\dot{x} = f(x_o, u_o) + \frac{\partial f}{\partial x}\bigg|_{(x_o, u_o)} (x - x_o) + \frac{\partial f}{\partial u}\bigg|_{(x_o, u_o)} (u - u_o) \tag{3}$$

Utilizing equation three above, the linearization at a steady operating point of the process of facility results in equation four:

$$\Delta \dot{x} = A\Delta(x) + B\Delta u \tag{4}$$

where $$A = \frac{\partial f}{\partial x}\bigg|_{(x_o, u_o)} \text{ and } B = \frac{\partial f}{\partial u}\bigg|_{(x_o, u_o)}$$

For linearization at an unsteady or non-equilibrium point of the process of facility 100, the nominal trajectory can be represented as function five:

$$(x_o(t), u_o(t)) \tag{5}$$

On the nominal trajectory of the non-linear process occurring at facility 100, equation six is satisfied:

$$\dot{x}_0 = f(x_0(t), u_0(t)) \tag{6}$$

As above, considering a small deviation ($\Delta x$) from the operating point of the process of facility 100, results in equation seven:

$$x(t) = x_0(t) + \Delta(x) \tag{7}$$

Performing the Taylor series expansion for equation seven around the operating point ($x_0(t), u_0(t)$), results in equation eight, where higher order terms have been ignored:

$$\dot{x} = \tag{8}$$
$$f(x_o(t), u_o(t)) + \frac{\partial f}{\partial x}\bigg|_{(x_o(t), u_o(t))} (x - x_o(t)) + \frac{\partial f}{\partial u}\bigg|_{(x_o(t), u_o(t))} (u - u_o(t))$$

Utilizing equation eight above, the linearization at an unsteady steady point of the process of facility 100, results in equation nine:

$$\Delta \dot{x} = A(t)\Delta(x) + B(t)\Delta u \tag{9}$$

where $$A(t) = \frac{\partial f}{\partial x}\bigg|_{(x_0(t), u_0(t))} \text{ and } B(t) = \frac{\partial f}{\partial u}\bigg|_{(x_0(t), u_0(t))}$$

and A and B are time dependent.

An approximation for equation nine above is equation ten (excluding higher order terms):

$$\dot{x} = f(x_o(0), u_o(0)) + \frac{\partial f}{\partial x}\bigg|_{(x_o(0), u_o(0))} \tag{10}$$
$$(x - x_o(0)) + \frac{\partial f}{\partial u}\bigg|_{(x_o(0), u_o(0))} (u - u_o(0))$$

Equation ten is the equivalent of equation eleven:

$$\Delta \dot{x} = A\Delta(x) + B\Delta u \quad (11)$$

where $$A = \frac{\partial f}{\partial x}\bigg|_{(x_O(0), u_O(0))} \text{ and } B = \frac{\partial f}{\partial u}\bigg|_{(x_O(0), u_O(0))}$$

and A and B are constants that can be evaluated at the start of the trajectory.

Control system 10 varies the number of linearizations or model updates that occur over a given time period so that a comparison can be made with a reference model, such as the non-linear model or a reference linearized model having a higher linearization rate (e.g., linearized at every step of the process) than the other linearized models.

Figure 2:
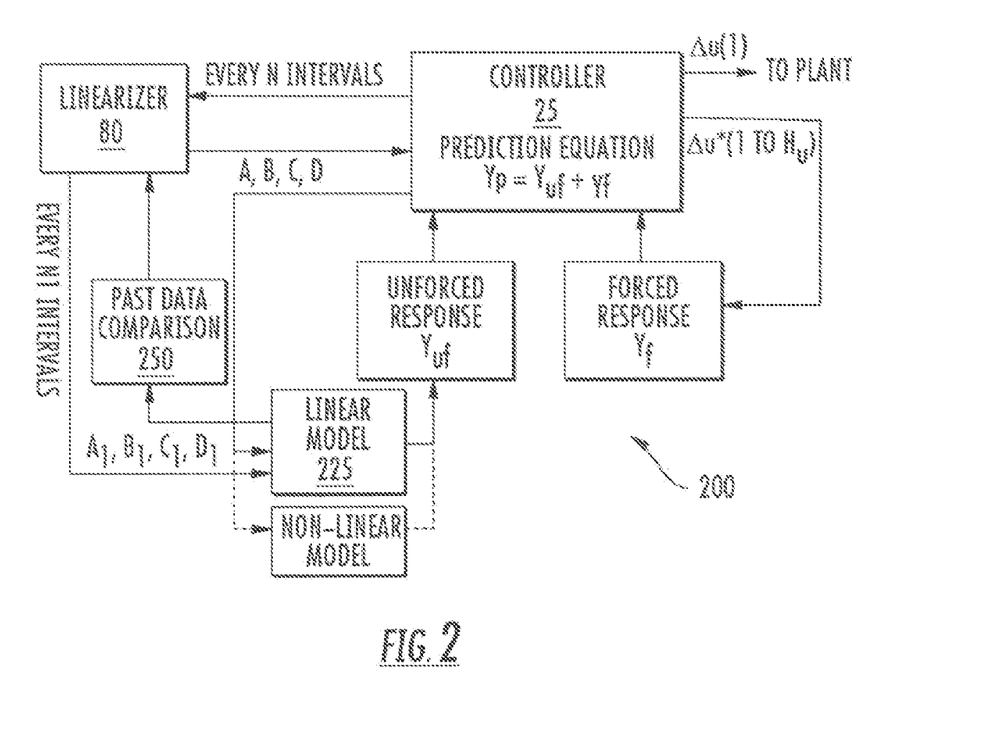
FIG. 2 is a schematic illustration of another exemplary system for process control according to an embodiment of the present invention.

Referring to FIG. 2, another exemplary embodiment of a control system is shown and generally represented by reference numeral 200. Control system 200 can be used with various processing facilities and various processes, such as manufacturing processes, chemical plants and oil refineries, to name but a few. The present disclosure also contemplates the use of control system 200 with systems undergoing processes that may result in other types of end products, such as control of a gas turbine powering an aircraft. The particular type of system, facility and/or process that is to be controlled is not intended to be limited. Control system 200 can provide for control of a multi-variable process and can be applied to a non-linear process.

Control system 200 can include one or more components described above with respect to system 10 which have been similarly numbered. The controller 25 can be provided with, generate or otherwise obtain a prediction equation, which can be a non-linear model or a part thereof, that is representative of the process or a portion thereof that is to be controlled. The prediction equation can include the unforced output response due to the past move or action of the control device(s) represented by $Y_{uf}$ and the forced response due to future moves or actions of the control device(s) represented by $Y_f$. The prediction equation can be linearized by the linearizer 80 at particular intervals, such as represented by N which is the linearization update frequency for the controller. The linearizer 80 can determine state space matrices A1, B1, C1, and D1 for a linear model 225 of the process to determine the unforced output response $Y_{uf}$. The linear model 225 can be used to replace the use of a non-linear model, which is represented by the dashed lines.

The controller 25 can utilize future move changes over the control horizon $\Delta u^*$ to determine the forced response $Y_f$. An action or move change $\Delta u(1)$ can then be determined and implemented at the control device(s). A past data comparison 225 (e.g., a previous action or move change implemented by the controller 25) can be used to further improve the generation of the linear model.

Figure 3:
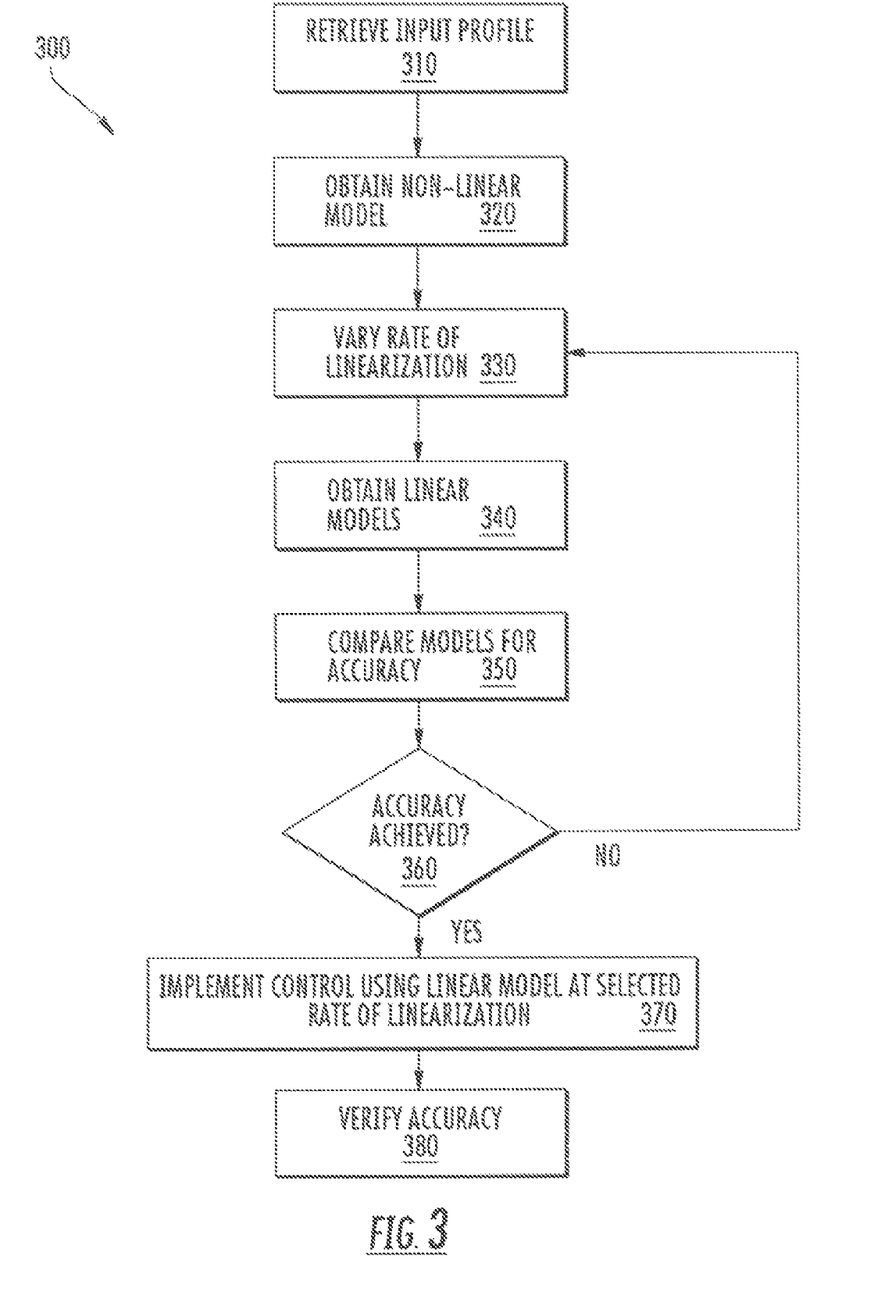
FIG. 3 is a flow chart illustrating an exemplary method for process control according to an embodiment of the present invention using the system of FIG. 1 or 2.

Referring to FIG. 3 a method for process control is shown and generally represented by reference numeral 300. The description of the method 300 can be performed with respect to the features of system 10 and/or 200 as illustrated by way of example in FIGS. 1 and 2. However, the method 300 can be performed using other control systems as well. In step 310, the control system 10 or 200 can retrieve or otherwise be provided with an input profile associated with the non-linear process of facility 100. The input profile can be used for defining one or more variables associated with the process and the non-linear model. For example, the input profile can be based upon independent variables associated with the process, such as reagent feed rates or temperatures. In step 320, the modeling tool 75 of the control system 10 or 200 can generate or otherwise be provided with a non-linear model representative of the non-linear process occurring at facility 100.

In step 330, the linearizer 80 can vary the number of linearization points over a given time period. The linearization or linearized model update can occur at intervals (e.g., equally spaced, log-based, or other non-equal intervals) rather than at every step. The modeling tool 75 can in step 340 obtain a plurality of linearized models based upon the non-linear model and using a plurality of different linearization rates. In step 350, a comparison of the plurality of linearized models can be made with a reference model based upon a number of factors, including accuracy and computational load. In one embodiment, the reference model can be the non-linear model. In another embodiment, the reference model can be a linearized model that has a higher linearization rate than the plurality of linearized models with which it is being compared. In another embodiment, the reference model can be a linearized model that has been linearized at every step of the process.

For example, the comparison of the plurality of linearized models with the non-linear model can be based upon a plot of a particular output parameter considered significant to the process (e.g., average molecular weight in a polymerization process) for each of the plurality of linearized models and the non-linear model over a given time period. This plot can be viewed by an operator to assess the extent of non-linearity involved in the process. The operator can then select one of the linearization rates by visualizing the accuracy of the linearized model with different linearization rates as compared to the reference model, such as the non-linear model. In one embodiment, information associated with the computational load for each of the linearized models can be presented to the operator so that the operator can manually select a desired linearization rate based upon a balancing of the accuracy of the linearized model with the computational load that would be required. In another embodiment, the comparison of the linearized models with the non-linear model can be performed automatically by control system 10 or 200 pursuant to a balancing algorithm that considers accuracy and/or computational load, as well as other factors.

In step 360, if a desired level of accuracy is not achieved by the linearization rates utilized by linearizer 80 then method 300 can return to step 330 and use other linearization rates to adjust the accuracy, such as increasing the linearization rate to improve accuracy or decreasing the linearization rate to decrease the computational load. If on the other hand, a desired level of accuracy is achieved, then in step 370 the controller 25 can implement control over the process of facility 100 by using a linearized model having the selected rate of linearization. Implementation of the control can occur through various techniques, such as communicating one or more control signals from the controller 25 to one or more of the control devices 150. In step 380, control system 10 or 200 can verify the accuracy of the linearized model, such as through use of a different input profile and/or different rates of linearization.

EXAMPLE 1

Figure 4:
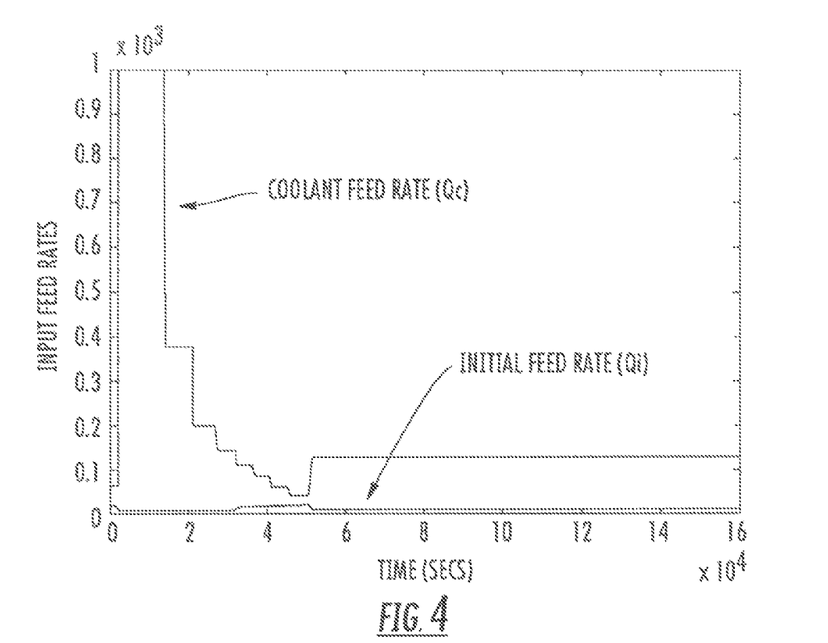
FIG. 4 is an input profile used in a simulated example of the process control according to an embodiment of the present invention for a polystyrene process.

At least portions of method 300 were performed for determining a controller algorithm or technique for a polystyrene process. The desired control was a particular grade transition for the polystyrene product. Grade transitions are the set of process operations necessary to change from producing an initial grade of a product to a final desired grade of a product. Grades of a polymer product are made from the same polymer but exhibit different end use properties, such as color, texture, mechanical strength, average molecular weight, and so forth. An input profile was utilized based upon an initial reagent feed rate and a coolant feed rate associated with the polystyrene process as shown in FIG. 4. The input profile was utilized to simulate a non-linear model for the polystyrene process. Linearized models were then simulated at several different linearization rates (N).

Figure 5:
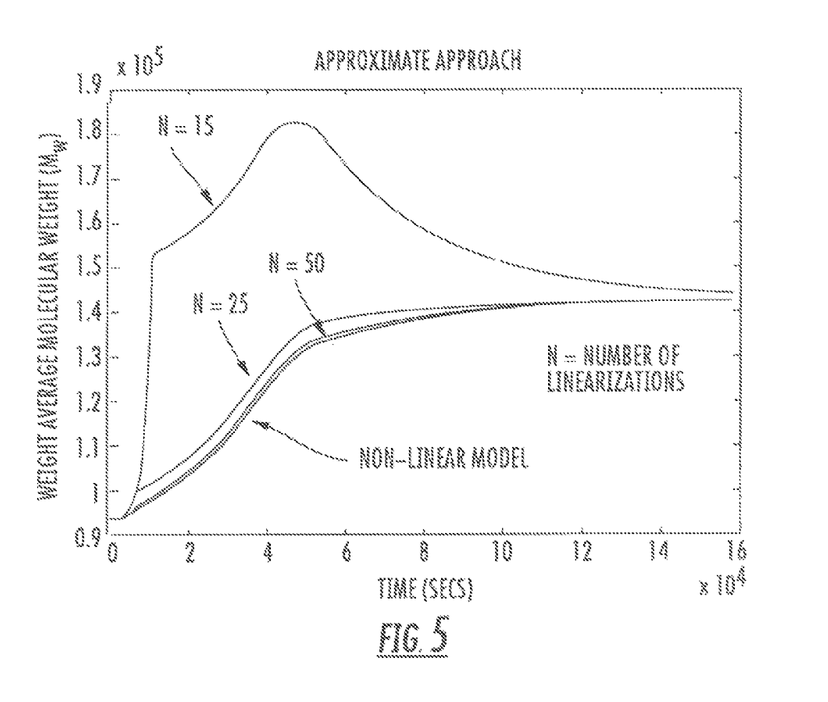
FIG. 5 is a comparison of average molecular weight for various linearization intervals based on the polystyrene model and input profile of FIG. 4.

An output, being the average molecular weight of the polystyrene product at the new grade, was plotted for each of the linearized models (having a different number of linearizations) and the non-linear model over the simulation time as shown in FIG. 5. From this information, a comparison of accuracy of the different linearized models as compared to the reference non-linear model can be made by the operator or control system 10 or 200. As can be seen from FIG. 5, increasing the linearization rate results in linearized models that are able to predict the average molecular weight of the polystyrene closer to the prediction provided by the reference non-linear model. A linearization rate of N=25 was found to provide a satisfactory approximation for this particular grade transition control process.

Figure 6:
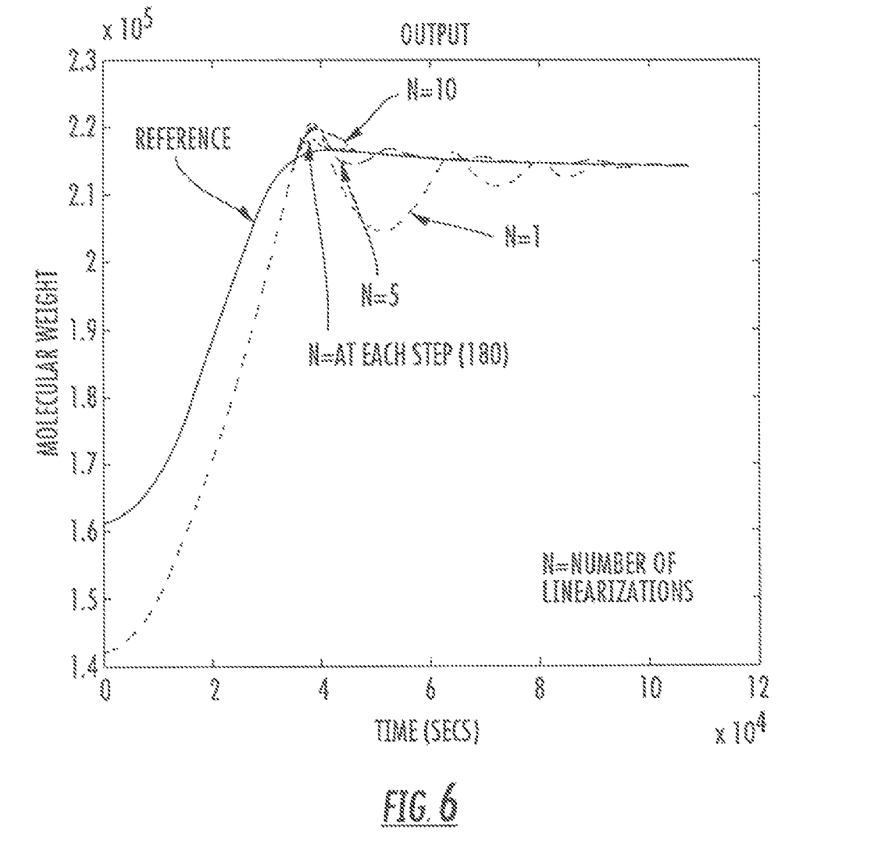
FIG. 6 is a comparison of average molecular weight using a traditional linear and non-linear controller along with a controller that was linearized at various intervals based on the polystyrene process and input profile of FIG. 4

FIG. 6 provides a comparison of the results obtained using a traditional linear reference and a conventional non-linear controller (N=180) along with a controller according to the present disclosure that was linearized at fewer points spaced equally in time during the polystyrene process. The controller with fewer linearizations (N=10) gave similar results, with a reduced computational burden (on the order of a ten times reduction in computational time), when compared to the traditional non-linear controller which linearized at every step (N=180).

Control system 10 can use linearization effects at regular intervals to provide an operator with a better understanding of the non-linearity in the process, (e.g., modeled based on first principle model). A recommendation for the number of linearizations or model updates that are required can then be made to improve the closed loop performance for the control of the particular process. Controller 25 can deliver better control performance as compared to controllers that use a fixed linearization rate, by not only giving better tracking but also making the controller computationally more efficient. Control system 10 or 200 can linearize at intervals (e.g., regular intervals) instead of at each step, thereby reducing the computational load while maintaining performance.

The present disclosure contemplates the use of a computer system within which a set of instructions, when executed, may cause the machine to perform any one or more of the methodologies discussed above. The computer instructions can be embodied in a storage medium. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, the term "machine" shall be taken to include a single machine or any collection of machines that individually or jointly execute a set (or multiple sets) of instructions to perform any one or more of the methodologies discussed herein.

The computer-readable storage medium can have stored thereon one or more sets of instructions (e.g., software) embodying any one or more of the methodologies or functions described herein, including those methods illustrated above. The computer-readable storage medium can be an electromechanical medium such as a common disk drive, or a mass storage medium with no moving parts such as Flash or like non-volatile memories. The instructions may also reside, completely or at least partially, within a main memory, a static memory, and/or within a processor during execution thereof by the computer system. The main memory and the processor also may constitute computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein. The present disclosure contemplates a machine readable medium containing instructions, or that which receives and executes instructions from a propagated signal so that a device, such as connected to a network environment can send or receive data, and to communicate over the network using the instructions.

While the computer-readable storage medium can be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a computer-readable storage medium or a distribution medium, as listed herein and including art-recognized equivalents and successor media, in which the software implementations herein are stored.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. Therefore, it is intended that the disclosure not be limited to the particular embodiment(s) disclosed as the best mode contemplated for carrying out this invention, but that the invention will include all embodiments falling within the scope of the appended claims.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims.

What is claimed is:

1. A method of controlling a non-linear process, the method comprising:
    providing a non-linear model based at least in part on the non-linear process;
    providing a plurality of linearized models based at least in part on the non-linear model,
    the plurality of linearized models being linearized at different linearization rates;
    selecting one of the plurality of linearized models based at least in part on a comparison of the plurality of linearized models with a reference model; and
    controlling the non-linear process by sending one or more control signals from a controller to at least one control device, wherein the one or more control signals are determined using the selected one of the plurality of linearized models.

2. The method of claim 1, wherein the reference model is a reference linearized model that has a linearization rate greater than the linearization rates of each of the plurality of linearized models.

3. The method of claim 1, wherein the reference model is a reference linearized model that is linearized at each step of the non-linear process.

4. The method of claim 1, wherein the comparison of the plurality of linearized models with the reference model is based at least in part on at least one of an accuracy of predicting an output parameter of the non-linear process and a computational load for linearizing each of the plurality of linearized models.

5. The method of claim 1, wherein the plurality of linearized models are generated by a control system operably coupled to the at least one control device integrated into the non-linear process.

6. The method of claim 5, wherein the control system utilizes Kalman filtering to linearize the non-linear model.

7. The method of claim 1, wherein the non-linear model and the plurality of linearized models are simulated based at least in part on an input profile.

8. The method of claim 7, wherein the input profile is associated with one or more input parameters of the non-linear process.

9. The method of claim 1, wherein the at least one control device is selected from the group consisting of a valve, a switch, a motor, a heating apparatus, a cooling apparatus, and any combinations thereof.

10. A control system for controlling processing systems, the control system comprising:
    one or more control devices operably coupled to a processing system for controlling a process of the processing system;
    a modeling tool to provide a non-linear model based at least in part on the process and to provide a plurality of linearized models based at least in part on the non-linear model, the plurality of linearized models being linearized at different linearization rates; and
    a controller operably coupled to the modeling tool, wherein the controller selects one of the plurality of linearized models based on a comparison of the plurality of linearized models with a reference model, wherein the controller sends one or more control signals to at least one of the one or more control devices, and wherein the one or more control signals are determined using the selected one of the plurality of linearized models.

11. The control system of claim 10, wherein the reference model is the non-linear model or a reference linearized model having a linearization rate greater than the linearization rates of each of the plurality of linearized models.

12. The control system of claim 10, further comprising a user interface to present the comparison of the plurality of linearized models with the reference model, wherein the user interface receives the selected one of the plurality of linearized models in response to presenting the comparison of the plurality of linearized models with the reference model.

13. The control system of claim 10, wherein the comparison of the plurality of linearized models with the reference model is based at least in part on at least one of an accuracy of predicting an output parameter of the process and a computational load for linearizing each of the plurality of linearized models.

14. The control system of claim 10, wherein the modeling tool utilizes Kalman filtering to linearize the non-linear model.

15. The control system of claim 10, wherein at least one of the one or more control devices is selected from the group consisting of a valve, a switch, a motor, a heating apparatus, a cooling apparatus, a temperature sensor, a pressure sensor, and any combinations thereof.

16. The control system of claim 10, wherein the non-linear model and the plurality of linearized models are simulated based at least in part on an input profile.

17. The control system of claim 16, wherein the input profile is associated with one or more input parameters of the process.

18. The control system of claim 10, wherein the one or more control devices comprise one or more sensors that send operational parameters to the controller, and wherein one or more operational variables are generated by the controller based at least in part on the operational parameters.

19. A non-transitory computer-readable storage medium comprising non-transitory computer-readable program instructions for controlling a non-linear process, said program comprising:
program instructions for causing a computer to receive a non-linear model of the non-linear process from a modeling tool;
program instructions for causing said computer to receive a plurality of linearized models based at least in part on the non-linear model from the modeling tool, the plurality of linearized models being linearized at different linearization rates;
program instructions for providing a comparison of the plurality of linearized models with a reference model; and
program instructions for causing said computer to send one or more control signals to at least one control device operably coupled with a processing system performing the non-linear process, wherein the one or more control signals are determined using a selected one of the plurality of linearized models, and wherein the selection is based at least in part on the comparison of the plurality of linearized models with the reference model.

20. The storage medium of claim 19, further comprising program instructions for causing said computer to present on a user interface the comparison of the plurality of linearized models with the reference model, wherein the comparison of the plurality of linearized models with the reference model is based at least in part on at least one of an accuracy of predicting an output parameter of the non-linear process and a computational load for linearizing each of the plurality of linearized models.

* * * * *